Aug. 5, 1924.
W. H. RUDOLPH ET AL
FAUCET REDUCER
Filed March 4, 1922
1,504,147
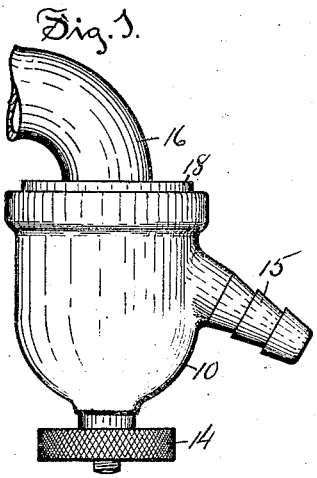
Fig. 1.
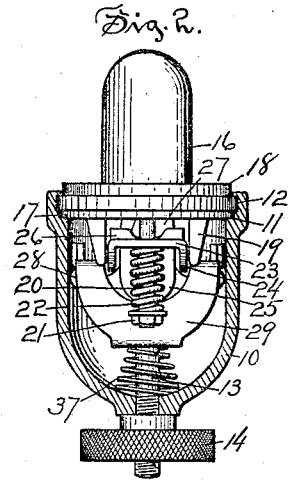
Fig. 2.
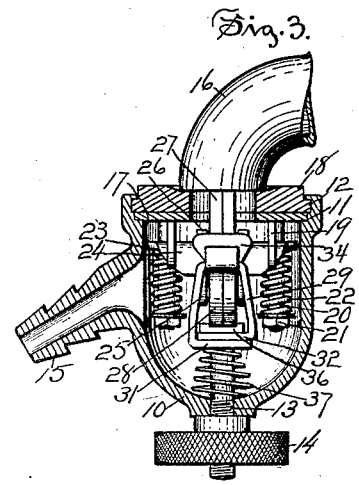
Fig. 3.
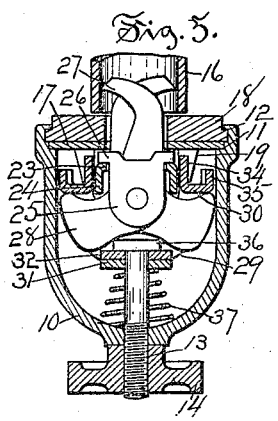
Fig. 5.
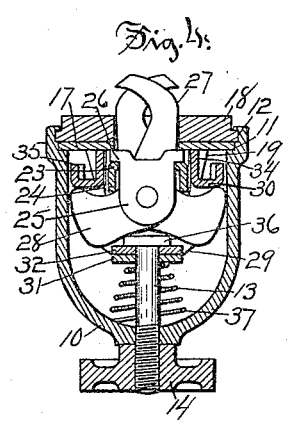
Fig. 4.
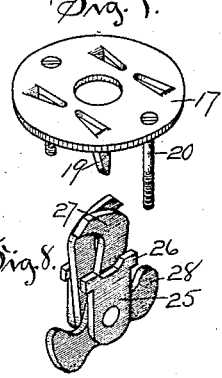
Fig. 7.
Fig. 8.
Fig. 9.
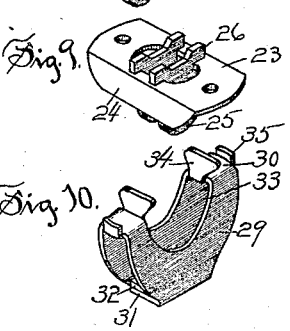
Fig. 10.
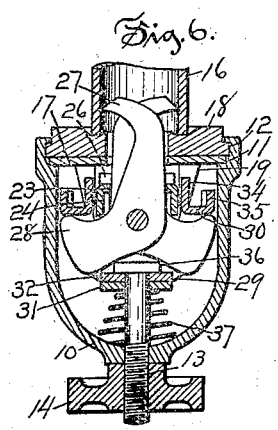
Fig. 6.
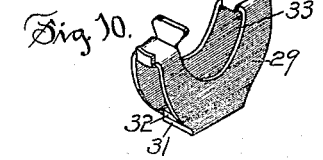
INVENTOR
Walter H. Rudolph
Louis V. Lucia.
by
Arthur C. Jenkins,
ATTORNEY Patented Aug. 5, 1924.

1,504,147

UNITED STATES PATENT OFFICE.

WALTER H. RUDOLPH AND LOUIS V. LUCIA, OF HARTFORD, CONNECTICUT, ASSIGNORS TO THE FULLER BRUSH COMPANY, OF HARTFORD, CONNECTICUT, A CORPORATION OF CONNECTICUT.

FAUCET REDUCER.

Application filed March 4, 1922. Serial No. 541,034.

*To all whom it may concern:*

Be it known that we, WALTER H. RUDOLPH and LOUIS V. LUCIA, both residing at Hartford, in the county of Hartford and State of Connecticut, have invented certain new and Improved Faucet Reducers, of which the following is a specification.

Our invention relates to the class of devices that are attached to faucets, or similar structures, to receive flexible connections, as hose, and an object of our invention, among others, is to construct a device of this class that may be readily and securely attached to a faucet, and especially when the passage in such faucet has a smooth inner surface, the reducer also having means for tightly closing the joint between itself and the end of the faucet.

One form of device embodying our invention, and in the construction and use of which the objects herein set out, as well as others, may be attained, is illustrated in the accompanying drawings in which—

Figure 1 is a side view of our improved reducer shown as secured to the end of a faucet.

Figure 2 is a view in central longitudinal section through the reducer, shown as attached to a faucet.

Figure 3 is a similar view, but on a plane at right angles to the plane of view of Figure 2.

Figure 4 is a view in central longitudinal section through the reducer showing the clamping jaws in their releasing positions.

Figure 5 is a similar view showing the clamping arms in their clamping positions.

Figure 6 is another similar view, but showing the parts in position to close the joint between the reducer and the end of the faucet, the clamp lever supports being removed.

Figure 7 is an isometric, perspective view of the supporting plate.

Figure 8 is a similar view of the clamp levers and their supports.

Figure 9 is another similar view of the clamp lever supporting plate and the clamp lever supports.

Figure 10 is still another similar view of the yoke for operating the clamp levers.

In the accompanying drawings the numeral 10 indicates a shell of our improved reducer that is preferably of inverted bell shape, with a shoulder 11 in the wall near its mouth and a groove 12 adjacent to the shoulder. A hole is formed through the opposite end of the shell to receive a clamping rod 13 that is threaded to receive a clamping nut 14 seated against the outer end of the shell. A nipple 15 projects from one side of the shell to receive a hose (not shown) for the purpose of conducting flow of liquid that passes through the shell from an outlet 16.

A supporting plate 17 is seated upon the shoulder 11 and a packing washer 18 with its edge secured within the groove 12 is seated upon the plate 17, said washer and plate each having a hole centrally therethrough, said holes registering one with the other. Guides 19 project downwardly from the underside of the plate, there being two pairs of guides each bar being located on the opposite side of the hole in the plate from the other bar, and for a purpose to be hereinafter described. These guides are preferably formed by bending down portions of the plate that is properly cut for this purpose, and as shown in Figure 7 of the drawings.

Spring supporting posts 20 are secured in holes in the plate and project downwardly therefrom, the lower ends of the posts being threaded to receive spring supporting nuts 21, against which clamp controlling springs 22 are seated. A clamp lever supporting plate 23 rests upon the springs 20, said supporting plate having sides 24 to afford a substantial guiding surface in contact with the guides 19. This supporting plate also has an opening to receive clamp lever supports 25 having supporting projections 26 at their upper ends, the opening in the plate 23 being shouldered and of a width to receive the clamp lever supports with their flat sides seated against said shoulders and with the said projections resting upon the upper surface of the plate, as clearly shown in Figure 9 of the drawings.

Clamp levers are pivotally mounted at the lower end of the clamp lever supports and between them. These levers are of bell crank shape and each comprises a clamping arm 27 and an actuating arm 28. The clamping arms extend upwardly through the opening in the clamp lever support 23 and through the openings in the supporting plate 17 and the packing washer 18, and as clearly shown in Figure 4 of the drawings, and in position to engage the inner walls of a faucet 16, as shown in Figure 5 of the drawings.

A yoke 29 rests upon the ends of the actuating arms 28, this yoke being of framelike construction and formed by bending a piece of metal properly shaped to provide yoke supports 30 at its upper end. The lower end is closed as by lips 31 and 32, bent from the side parts toward and overlapping one another, as illustrated in Figures 5 and 10 of the drawings. This yoke is open at its opposite edges, and it also has a central opening 33 at its upper edge, the clamping levers extending through said openings. Stop lugs 34 project upwardly from each of the yoke supports 30 and at opposite sides of the opening 33, and guide lugs 35 project upwardly from the opposite edges of said supports, and as shown in Figure 10 of the drawings.

A head 36 on the clamping rod 13 rests against the inner surface of the lip 32, said rod projecting through the lips 31 and 32, and as shown in Figures 4, 5 and 6 of the drawings. A spring 37 is located between the lip 31 and the bottom of the shell to exert an upward pressure against the yoke 29.

In the operation of the device the shell 10 is placed with the packing washer 18 against or in close proximity to the end of the faucet 16, and as illustrated in Figure 5 of the drawings. The clamping nut 14 being now turned, the clamping rod 13 will be drawn downwardly, pulling down the yoke 29 against the ends of the actuating arms 28. This will cause the clamping levers to be rotated on their pivots, bringing the clamping arms 27 into contact with the inner surface of the faucet 16 and as shown in Figure 5 of the drawings. When these clamping arms have been seated firmly against the inner surface of the faucet, further turning movement of the clamping nut 14 will cause the shell 10 to be carried upwardly toward the faucet, the controlling springs 22 permitting this movement, and which movement, but for the interposition of said springs, would be prevented. The packing washer 18 is thus forced tightly against the end of the faucet, and all chance of leaking of liquid at this point is prevented.

We claim:

1. A reducer comprising a shell having an outlet, clamp levers mounted within the shell, a packing element at the end of the shell, said levers projecting through said packing element, and means for yieldingly forcing the clamp levers into clamped position and the packing element into packed position.

2. A reducer comprising a shell having an outlet, a packing element at the end of the shell, clamp levers within the shell and projecting through said packing element, and mechanism within the shell and comprising means for yieldingly forcing the clamp levers into clamped position, and then through resistance of the clamp levers to force said packing element into packed position.

3. A reducer comprising a shell open at one end and having an outlet, a packing element closing the end of the shell, a supporting plate secured to the shell, a clamp lever supporting plate yieldingly supported by said supporting plate, clamp levers pivotally supported by said clamp lever supporting plate, and means connected with said clamp levers and with said shell to force said levers and said shell in opposite directions.

4. A reducer comprising a shell having an outlet, a packing element at the end of the shell, clamp levers mounted within the shell and projecting through said packing element, mechanism within the shell comprising means for forcing the clamp levers into clamped position and then through the resistance of the clamp levers to force said packing element into packed position, a clamping rod extending from within the shell to the outer surface thereof, and an actuating member mounted on said rod to operate said mechanism.

5. A reducer comprising a shell having an outlet, a packing element at the end of the shell, a supporting plate secured to the shell, a clamp lever supporting plate yieldingly supported by said supporting plate, clamp levers supported by said clamp lever supporting plate and projecting through said packing element, and means in engagement with said levers for operating them.

6. A reducer comprising a shell having an outlet, a packing element at the end of the shell, a supporting plate secured to the shell, a clamp lever supporting plate yieldingly supported by said supporting plate, guides extending from said supporting plate to guide the movement of said clamp lever supporting plate, clamp levers mounted on said clamp lever supporting plate and projecting through said packing element and said supporting plate, and means in engagement with said levers for operating them.

7. A reducer comprising a shell having an outlet, a packing element at the end of the shell, a supporting plate secured to the shell, a clamp lever supporting plate yieldingly supported by said supporting plate, clamp levers supported by said clamp lever supporting plate and projecting through said packing element and said supporting plate, means in engagement with said levers for operating them, and an actuating member connected with and to force said lever operating means in one direction, said actuating member being also in engagement with said shell to move it against force resisted by said clamp lever supporting plate.

8. A reducer comprising a shell open at one end and having an outlet, a supporting plate closing the end of the shell, a packing element seated on said plate, mechanism located within the shell and supported by said plate and comprising clamp levers projecting through said supporting plate and packing element, and means for moving said levers into clamped position and for moving said packing element into packing position.

9. A reducer comprising a shell having an outlet, a packing element at the end of the shell, a supporting plate secured to the shell, posts projecting downwardly from said plate, springs supported by said posts, a clamp lever supporting plate seated on said springs, clamp levers supported by said clamp lever supporting plate, and means for actuating a clamp lever operating means to move said levers into clamped position and said packing element into packed position.

10. A reducer comprising a shell having an outlet, a packing element at the end of the shell, a supporting plate secured to the shell, a clamp lever supporting plate yieldingly mounted and carried by said supporting plate and having an opening therein, clamp lever supports projecting through said opening and resting on the upper surface of said clamp lever supporting plate, clamp levers pivotally mounted between said clamp lever supports and projecting through said supporting plate and said packing element, and means for actuating said levers to move them to clamped position.

11. A reducer comprising a shell having an outlet, a packing element at the end of the shell, clamp levers pivotally mounted within the shell and projecting through said packing element, a yoke in engagement with said clamp levers to operate them, and means for actuating said yoke.

12. A reducer comprising a shell having an outlet, a packing element at the end of the shell, clamp levers pivotally mounted within the shell, a frame-like yoke having an opening within which said clamp levers are located, said yoke resting upon one arm of each of said levers and said levers projecting through said packing element, and means in engagement with said yoke and projecting through the shell for operating said clamp levers.

13. A reducer comprising a shell having an outlet, a packing element at the end of the shell, a clamp lever supporting plate yieldingly mounted within the shell, clamp levers pivotally supported by said clamp lever supporting plate and projecting through said packing element, a yoke partially encircling said clamp lever supporting plate and resting upon the ends of said clamp levers, and means projecting through the shell and in engagement with said yoke to operate said levers.

14. A reducer comprising a shell having an outlet, a packing element at the end of the shell, a clamp lever supporting plate yieldingly mounted within the shell, clamp lever supports projecting through said plate and supported thereby, clamp levers pivotally mounted between said supports and projecting through said clamp lever supporting plate and through said packing element, a yoke having side parts between which said clamp lever supports and said clamp levers are located, said yoke partially encircling said clamp lever supporting plate, and means projecting through said shell and secured to said yoke to operate it.

15. A reducer comprising a shell having an outlet, a packing element at the end of the shell, a clamp lever supporting plate yieldingly mounted within the shell, clamp levers supported by said plate and projecting therethrough and through said packing element, a frame-like yoke having yoke supports connecting its sides and resting upon the ends of said levers, lips projecting from opposite sides of said yoke, and means projecting through said shell and through said lips for actuating said yoke.

16. A reducer comprising a shell having an outlet, a packing element at the end of the shell, a clamp lever supporting plate yieldingly mounted within the shell, clamp levers supported by said plate and projecting therethrough and through said packing element, a frame-like yoke comprising sides between which said clamping levers are mounted and yoke supports connecting said sides and resting upon said levers, guides projecting from said yoke supports, and means connected to said yoke to operate it.

17. A reducer comprising a shell having an outlet, a supporting plate closing the open end of the shell, a packing element seated on said plate, a clamp lever supporting plate yieldingly suspended from said supporting plate, clamp lever supports resting upon said clamp lever supporting plate, clamp levers pivotally mounted between said supports and projecting through openings in said clamp lever supporting plate, in said supporting plate and in said packing element, a frame-like yoke comprising sides between which said clamp levers are located, yoke supports connecting said sides and resting upon arms of said levers, and an actuating rod projecting through said shell and in engagement with said yoke to actuate it.

18. A reducer comprising a shell having an outlet, a packing element at the end of the shell, a clamp lever supporting plate mounted within the shell, a clamp lever support separately formed and projecting from said clamp lever supporting plate, clamp levers pivotally mounted on said support, and means for rocking said levers on their pivot.

19. A reducer comprising a shell having an outlet, a packing element at the end of the shell, clamping levers supported within the shell, an actuating rod to move said levers to their clamped positions, and means for returning said levers to their unclamped positions.

20. A reducer comprising a shell having an outlet, a packing element at the end of the shell, clamping levers supported within the shell, means for actuating said levers to move them to clamped position to secure the shell to an object, and means for shifting said levers to the limit of their unclamping movement.

21. A reducer comprising a shell having an outlet, a packing element at the end of the shell, a separately formed supporting plate against which said packing element rests, means for securing said packing element and said plate to the shell, clamping levers located within the shell, and means for operating said clamping levers.

22. A reducer comprising a shell, having an outlet, a clamping mechanism located within the shell, a packing element located at one end of the shell, and a supporting plate to removably support the said mechanism and to provide a seat for the said packing element.

WALTER H. RUDOLPH.
LOUIS V. LUCIA.